United States Patent [19]

Eijkelenkamp et al.

[11] Patent Number: 4,559,581
[45] Date of Patent: Dec. 17, 1985

[54] ELECTROLYTIC CAPACITOR

[75] Inventors: Antonius J. H. Eijkelenkamp, Eindhoven; Jan H. Held; Gerardus J. A. Rientjes, both of Zwolle, all of Netherlands

[73] Assignee: U.S. Philips Corporation, New York, N.Y.

[21] Appl. No.: 628,074

[22] Filed: Jul. 5, 1984

[30] Foreign Application Priority Data

Jul. 18, 1983 [NL] Netherlands ............................ 8302559

[51] Int. Cl.[4] .............................................. H01G 9/00
[52] U.S. Cl. ..................................... 361/433; 252/62.2
[58] Field of Search ........................... 361/433; 29/570; 252/62.2

[56] References Cited

U.S. PATENT DOCUMENTS 3,585,459 6/1971 Hills ..................................... 252/62.2
3,812,039 5/1974 Niwa .................................... 252/62.2

Primary Examiner—L. T. Hix
Assistant Examiner—Douglas S. Lee
Attorney, Agent, or Firm—Norman N. Spain

[57] ABSTRACT

An electrolytic capacitor the electrolyte solution of which consists of a solution of salt of an amine of acetic acid and boric acid between certain ratio limits, in one or more mono-alkylated or di-alkylated amides or a carboxylic acid having 1, 2 or 3 carbon atoms. Instead of acetic acid, propionic acid may also be used. These solutions have a conductivty of at least 1 mS/cm at 25° C. and may be used up to high operating voltages with low electric losses. They are chemically stable up to high temperatures, as a result of which the capacitor is electrically stable.

9 Claims, 4 Drawing Figures

ELECTROLYTIC CAPACITOR

BACKGROUND OF THE INVENTION

The invention relates to an electrolytic capacitor having a substantially non-aqueous fill electrolyte solution of a low resistivity which is suitable for use up to high operating voltages.

A fill electrolyte solution for electrolytic capacitors must satisfy a number of important requirements.

The solution must be capable of maintaining the dielectric oxide film provided on the anode by forming at the applied voltage. In particular at a high voltage, for example 385 V, no dielectric breakdowns may occur: the spark voltage or breakdown voltage of the solution must be sufficiently high.

The restivity of the electrolyte solution must be low because it contributes to the equivalent series resistance (esr, measured at higher frequencies of 10-100 kHz.

It has been found in practice so far that the combined properties of a high breakdown voltage and a low resistivity are difficult to realize in one electrolyte solution. For these reasons it was usual to use different solutions for the various voltage ranges. For example, known solutions for use in electrolytic capacitors of 385-400 V have a resistivity of 1000-2000 $\Omega$ cm at 20° or even higher.

Recent new applications of electrolytic capacitors require a reduction of the dielectric losses. In particular the impedance Z at 10-100 kHz must be low, inter alia to ensure a sufficient ripple current load.

From German Offenlegungsschrift No. 15 89 671, for example, a capacitor is known which comprises an electrolyte solution having one or more aprotic dipolar solvents in which an amine and one or more acids are dissolved. The solutions belong to those which do not have the desired combination of properties.

BRIEF SUMMARY OF THE INVENTION

It is the object of the invention to provide an electrolytic capacitor having an electrolyte solution which enables the use of the capacitor up to high operating voltages 385 to 400 V, with low electric losses and which is chemically stable up to high temperatures as a result of which the capacitor is electrically stable.

According to the invention, an electrolytic capacitor comprising an anode provided with a dielectric layer by anodic oxidation, a cathode, a spacer and an electrolyte solution consisting of a solution of a salt of an amine with an organic carboxylic acid and boric acid in a solvent consisting of one or more dipolar aprotic compounds is characterized in that the solvent of the electrolyte consists essentially of one or more mono-alkylated or di-alkylated amides of carboxylic acids having 1, 2 or 3 carbon atoms in which are dissolved an amine in a quantity of at least 0,20 mol per kg of solvent, acetic acid and/or propionic acid in a quantity of at least 0,20 mol per kg of solvent, and boric acid in a quantity of at least 0,01 mol per kg of solvent, the amine being present in a quantity between substantially 0,25 to 1.5× the number of equivalents of the acetic acid and-/or the propionic acid, and the boric acid in a quantity which is at most approximately equal to 5× the number of equivalents of the acetic acid and/or the propionic acid, all this in such manner that a conductivity of a least 1 mS/cm at 25° C. is reached.

DETAILED DESCRIPTION OF THE INVENTION

The electrolyte combination in the solution according to the invention shows a surprising behaviour in its conductivity. In the conductometric titration of the acetic acid and/or propionic acid with the amine it appears that with a quantity less than 1 equivalent in the concentrations of 0,1-1 mol of the acetic acid and/or the propionic acid which is interesting for electrolytic capacitors a maximum in the conductivity occurs. If after completion the titration is continued with boric acid, the conductivity further increases until a second maximum occurs after the addition of a quantity of boric acid which is equal to the number of equivalents of the acetic acid with which was started.

Figure 1:
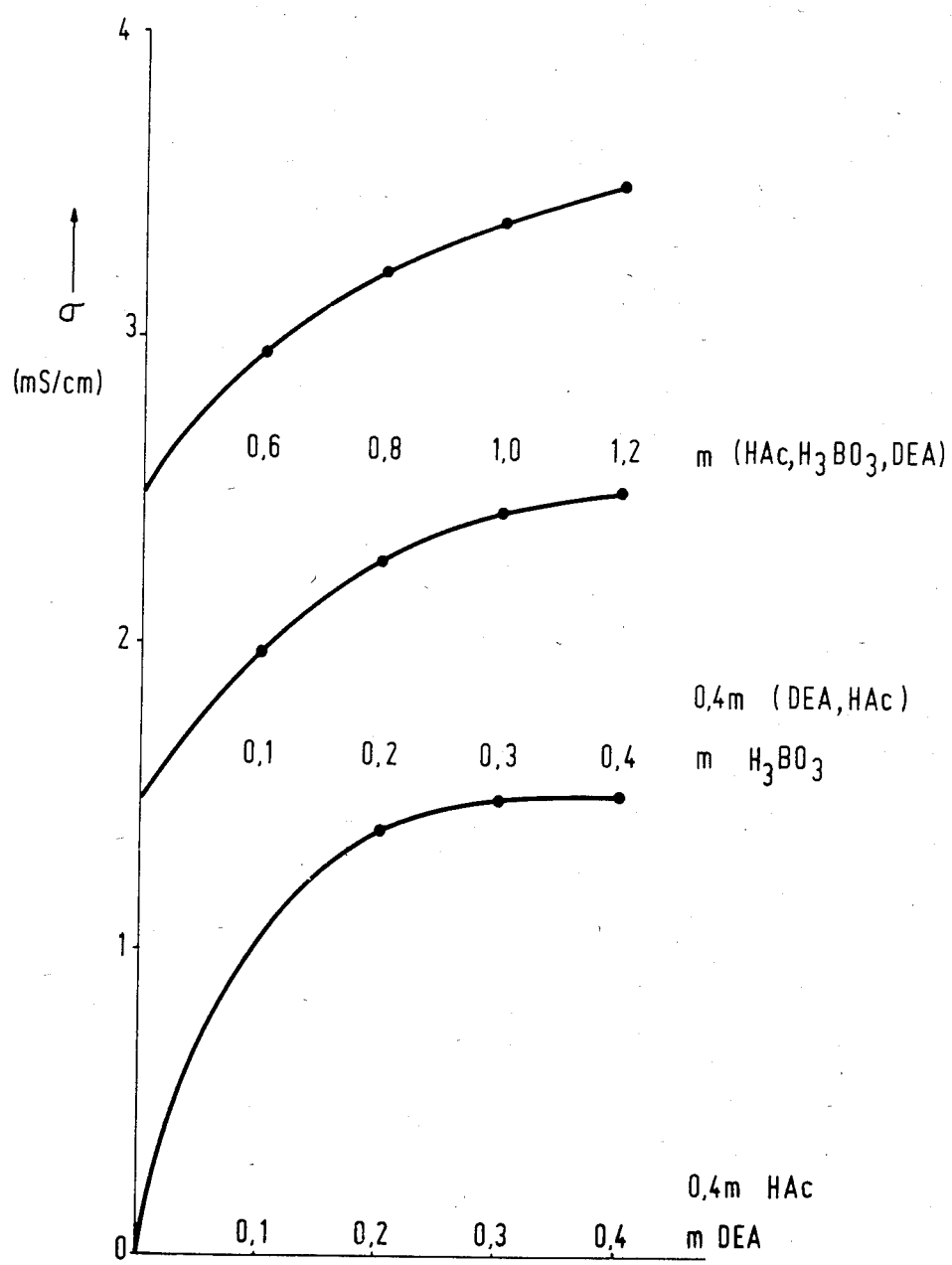
FIG. 1 is a graph showing the effects on the conductivity of a solution of acetic acid in a mixture of N,N-dimethylacetamide and N-monomethylacetamide, of titrations by diethylamine and boric acid.

In the curves of the accompanying FIG. 1 this phenomenon is demonstrated. This is shown with a 0,4 mol acetic acid (HAc) solution in a mixture of N,N-dimethylacetamide and N-monomethylacetamide in a mol ratio 4:1. In the lower curve titrations are carried out with diethylamine (DEA) the quantity of which is plotted on the horizontal axis. In the central curve titration is continued with boric acid (H$_3$BO$_3$). The top curve shows an increase of the total concentration with diethylamine, acetic acid and boric acid in the same ratio of 0,4 to 1,2 mol. The conductivity ($\sigma$) in mS/cm is plotted on the vertical axis. The temperature is always 25° C. The conductivity of the solution according to the invention in concentrations of 0,4 mol as a result of this comes at the particularly high value of approximately 2,5 mS/cm and with 1,2 mol at a value of 3,5 mS/cm. This corresponds to resistivities of 400 and 300 Ohm.cm at 25° C.

The amines to be used in the scope of the invention for practical considerations preferably consist of aliphatic amines, derived from hydrocarbons having 1 to 4 carbon atoms.

Figure 2:
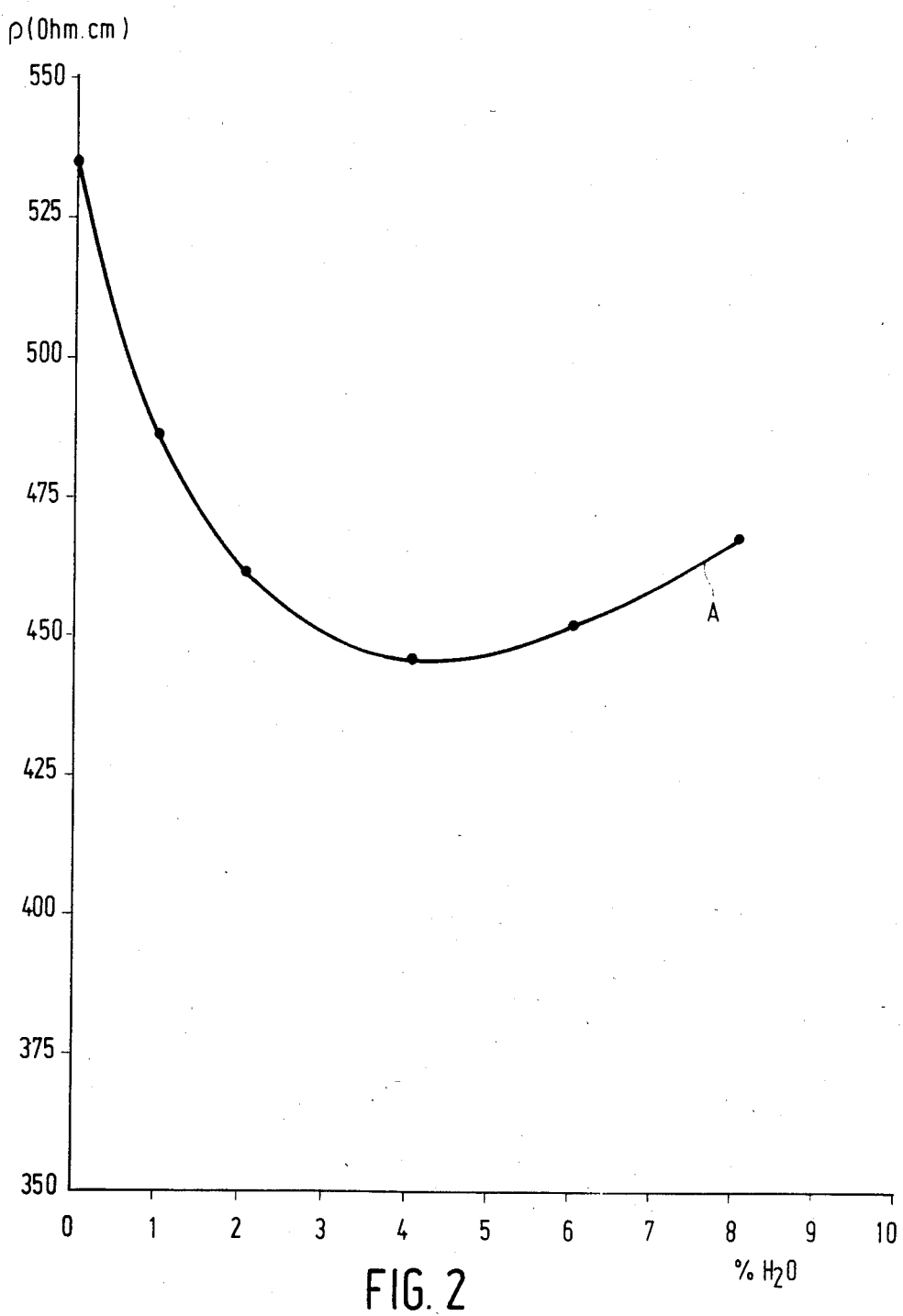
FIG. 2 is a graph showing the resistivity of a solution of the invention as a function of its water content.

According to a preferred embodiment the electrolyte solution comprises up to 10% by weight, preferably 4% by weight, of water. As a result of this the resistivity of the solution slightly decreases and the breakdown voltage of the solution is favourably influenced by it. FIG. 2 shows the resistivity $\rho$ as a function of the water content in % by weight of the solution A defined hereinafter.

A mixture of N,N-dimethylacetamide and N-monomethylacetamide with 15-50% by weight of N-monomethylacetamide is to be preferred as regards the solvent. The solutions composed herewith are useful down to −55° C.

Figure 3:
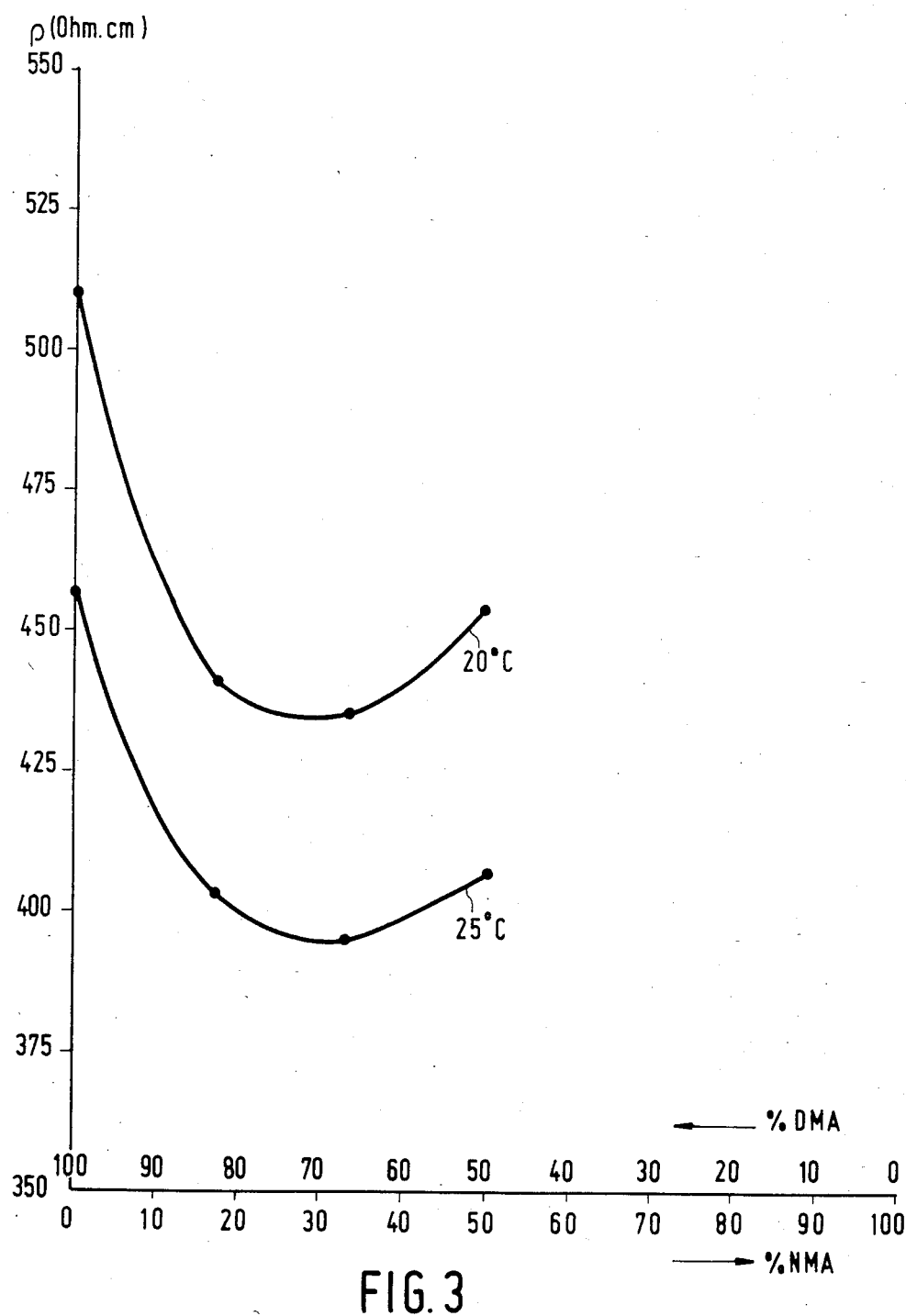
FIG. 3 is a graph showing the resistivity of various solutions containing N-monomethylacetamide as a function of the weight percent of N-monomethylacetamide present.

For illustration FIG. 3 shows the resistivity of solutions with acetic acid, boric acid and diethylamine each in a quantity of 0,4 mol/kg of solvent in mixtures of N-monomethylacetamide (NMA) and N,N-dimethylacetamide (DMA) with 4% by weight of water as a function of the share of NMA in % by weight.

Propionic acid which may be used in the solutions according to the invention instead of acetic acid gives a slightly lower conductivity. Butyric acid and isobutyric acid and carboxylic acids with even longer chains give conductivities which are useless within the scope of the invention.

The electrolyte solutions in the electrolytic capacitor according to the invention have a strikingly great stability. The life of said capacitors is such that they can withstand a test at 150° C. for 1500 hours. By the addition to the electrolyte solution of an optional oxidation agent—known per se—for example, an aromatic nitro compound, the gas evolution which usually occurs is suppressed, if necessary.

By way of example there will now be described a few solutions (A, B, C, D and E) for electrolytic capacitors according to the invention and the resulting life test data of the capacitors equipped therewith as compared with a known solution (F). In the following table 1 the following abbreviations are used:

TABLE I

| Components | A wt. % | A mol/ kg solv | B wt. % | B mol/ kg solv | C wt. % | C mol/ kg solv | D wt. % | D mol/ kg solv | E wt. % | E mol/ kg solv | F wt. % |
|---|---|---|---|---|---|---|---|---|---|---|---|
| DMA | 73,6 | | 62,2 | | | | 69,9 | | 68,3 | | 66,5 |
| NMA | 15,5 | | 13,1 | | | | 14,6 | | 14,3 | | |
| DMF | | | | | 75,3 | | | | | | |
| ethylene glycol | | | | | | | | | | | 22,5 |
| acetic acid | 2,1 | 0,4 | 5,4 | 1,2 | 5,4 | 1,2 | 5,1 | 1,0 | 2,0 | 0,4 | |
| boric acid | 2,2 | 0,4 | 7,0 | 1,5 | 7,0 | 1,5 | 5,2 | 1,0 | 7,7 | 1,5 | |
| diethylamine | 2,6 | 0,4 | 8,3 | 1,5 | 8,3 | 1,5 | 1,5 | 0,25 | 3,7 | 0,62 | |
| APB | | | | | | | | | | | 10,0 |
| water | 4,0 | | 4,0 | | 4,0 | | 4,0 | | 4,0 | | 1,0 |

DMA = N,N—dimethylacetamide
NMA = N—monomethylacetamide
DMF = N,N—dimethylformamide
APB = ammonium pentaborate.

Figure 4:
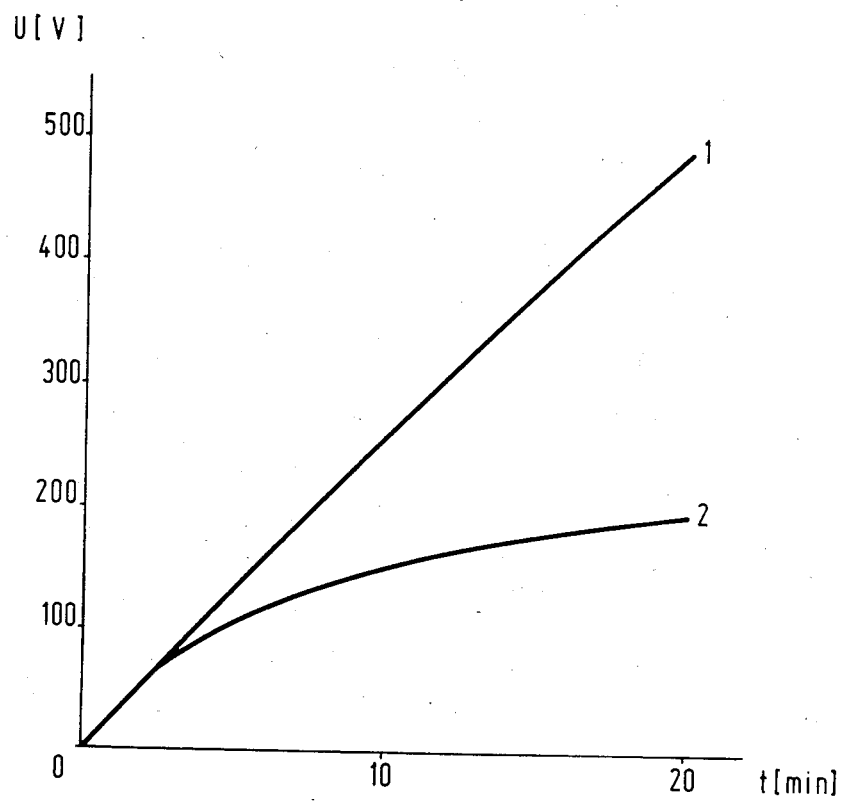
FIG. 4 is a graph showing the forming voltage as a function of time employing an electrolyte composition of the invention and one from which boric acid is omitted.

Electrolyte solution A with 4,0% by weight of water has a minimum in the resistivity as a function of the water content. A plane strip of aluminum, dimensions 5×1 cm², is formed with a constant current of 10 mA at 25° C. in electrolyte solution A and an identical strip is formed in the same liquid from which the boric acid has been omitted. The result is shown in FIG. 4 in curves 1 and 2, respectively, which shows the forming voltage U as a function of time t.

The breakdown voltage of solution A is at 500 V.

In the following table II the resistivity $\rho$ in Ohm-cm at 25° C. is given of electrolyte solutions with low and high concentrations of ionogenic substances in various solvents. The water content is always 4%.

| Ionogen | concentration mol/kg solv. | solvent | $\ominus$(Ohm · cm) | Elyt. |
|---|---|---|---|---|
| acetic acid | 0,4 | DMA | 457 | |
| boric acid | 0,4 | DMA/NMA 4:1 (mol) | 405 | A |

-continued

| Ionogen | concentration mol/kg solv. | solvent | $\ominus$(Ohm · cm) | Elyt. |
|---|---|---|---|---|
| diethylamine | 0,4 | | | |
| acetic acid | 1,2 | DMA | 330 | |
| boric acid | 1,5 | DMA/NMA 4:1 (mol) | 317 | B |
| diethylamine | 1,5 | DMF | 217 | C |

Electrolyte solutions on the basis of only dimethylacetamide as a solvent freeze at −55° C., while the electrolyte solutions on the basis of a mixture of dimethylacetamide and N-monomethylacetamide and of dimethylformamide are still liquid at this temperature. An additional advantage of the use of a mixture of dimethylacetamide and N-nomomethylacetamide is that the resistivity of the electrolyte solution prepared therewith is slightly lower than that of a solution with only dimethylacetamide with the same dissolved ionogenic substances.

In the following table III there is indicated the measured impedance of electrolytic capacitors at an operating voltage of 385 V at a number of temperatures. As electrolyte solutions are chosen those of the concentration 0,4 m (see table II) and as a solvent are chosen dimethylacetamide (DMA) and a mixture of dimethylacetamide and N-monomethylacetamide in the mol ratio 4:1 (DMA/NMA).

TABLE III

| | Impedance Z (mΩ) at 100 kHz | |
|---|---|---|
| Temp. °C. solvent → | DMA | DMA/NMA |
| +20 | 263 | 247 |
| −25 | 1000 | 1070 |
| −40− | 5330 | 2290 |
| −55 | 79500 | 6680 |

Table IV shows life test data for 385 V capacitors at a temperature of 85° C. The capacitors are composed in the usual manner from an anode foil and a cathode foil which are provided with a connection tab and are wound together with a porous separator placed between the two foils. The anode foil has been etched and then formed at 550 V. The cathode foil has been etched only so that the cathode capacity is much larger than the capacity of the formed anode foil. The resulting roll is impregnated with one of the indicated electrolyte solutions, then accommodated in an envelope and postformed. The dimensions of the tested electrolyte capacitors are 15 mm diameter and 50 mm length.

| Fill electrolyte | C (μF) | ΔC (%) after 1000 h | ΔC (%) after 2000 h | $R_s$ (mΩ) | $ΔR_s$ (%) after 1000 h | $ΔR_s$ (%) after 2000 h | Z (mΩ) | ΔZ (%) after 1000 h | ΔZ (%) after 2000 h |
|---|---|---|---|---|---|---|---|---|---|
| A | 20.0 | 0,9 | 1,0 | 1210 | 0,9 | −4,5 | 236 | −17 | −18 |
| B | 20,0 | 1,4 | 2,0 | 1100 | 3,8 | −2,0 | 185 | −22 | −20 |
| C | 20,1 | 1,1 | 1,9 | 1030 | 18 | 21 | 116 | 10 | 46 |
| D | 19,9 | 0,5 | 1,4 | 1470 | −21 | −29 | 327 | −47 | −51 |
| E | 20,1 | 1,0 | 1,4 | 1240 | −4 | −10 | 283 | −31 | −31 |
| F | 20,2 | 0,7 | 1,6 | 2810 | −48 | −53 | 1190 | −66 | −74 |

In the table, C is the capacity, $R_s$ is the equivalent series resistance at 100 Hz and Z is the impedance at 100 kHz. The electrolyte solutions are those which are further identified in Table I. The capacitors according to the invention have a much lower $R_s$ and Z than known electrolyte solution F; the stability of capacitors according to the invention is also considerably improved as compared with the known electrolyte solution.

In another test a capacitor was tested with solution A at 85° C. for 5000 hours. ΔC, $ΔR_s$ and ΔZ after termination proved to be +2, −8 and −15%, respectively.

Table V gives the results of a life test at 125° C. of a 63 V capacitor the anode of which is formed at 120 V and which is filled with solution A.

TABLE V

| | | | 1000 h | 2000 h | 3000 h |
|---|---|---|---|---|---|
| C (μF) | 321 | ΔC (%) | −4,4 | −5,1 | −5,2 |
| $R_s$ (m Ohm) | 273 | $ΔR_s$(%) | −9,9 | +7,4 | +7,6 |
| Z (m Ohm) | 158 | ΔZ(%) | −8,2 | +13 | +25 |

In Table VI the results are given of a life test at no lower than 150° C. of a 40 V capacitor the anode of which has been formed at 120 V and which is filled with solution A.

| | | | 1000 h | 2000 h |
|---|---|---|---|---|
| C (μF) | 321 | ΔC (%) | −6,4 | −8,3 |
| $R_s$ (m Ohm) | 273 | $ΔR_s$(%) | +9,2 | +43 |
| Z (m Ohm) | 158 | ΔZ (%) | +15,2 | +38 |

In the last-mentioned two life tests no reference electrolyte is incorporated because with the known electrolyte solution F at temperatures of 125 and 150°, respectively, the said quantities have changed inadmissibly already after a few hours. When using the solution according to the invention the capacity, the series resistance and the impedance show a surprising stability.

What is claimed is:

1. An electrolytic capacitor comprising an anode provided with a dielectric oxide layer by anodic oxidation, a cathode, a spacer and an electrolyte solution consisting of a solution of a salt of an amine with an organic carboxylic acid and boric acid in a solvent consisting of one or more dipolar aprotic compounds, characterized in that the solvent of the electrolyte consists essentially of one or more monoalkylated or dialkylated amides of carboxylic acids having 1, 2 of 3 carbon atoms in which are dissolved an amine in a quantity of at least 0,20 mol/kg of solvent, acetic acid and/or propionic acid in a quantity of at least 0,20 mol/kg of solvent, and boric acid in a quantity of at least 0,01 mol per kg of solvent, the amine being present in a quantity between substantially 0,25 to 1,5× the number of equivalents of the acetic acid and/or the propionic acid, and the boric acid being present in a quantity which is at most approximately equal to 5× the number of equivalents of the acetic acid and/or the propionic acid, all this in such manner that a conductivity of at least 1 mS/cm at 25° C. is reached.

2. A capacitor as claimed in claim 1, characterized in that the electrolyte solution comprises up to 10% by weight of water.

3. A capacitor as claimed in claim 2, characterized in that the electrolyte solution comprises 4% by weight of water.

4. A capacitor as claimed in claim 1, characterized in that the amine is an aliphatic amine derived from a hydrocarbon having 1 to 4 carbon atoms.

5. A capacitor as claimed in claim 1, characterized in that the solvent of the electrolyte consists of a mixture of N,N-dimethylacetamide and N-monomethylacetamide with 15–50% by weight of N-monomethylacetamide.

6. A capacitor as claimed in claim 1, characterized in that an oxidizing agent known per se is dissolved or dispersed in the electrolyte solution.

7. A capacitor as claimed in claim 2, characterized in that the amine is an aliphatic amine derived from a hydrocarbon having 1 to 4 carbon atoms.

8. A capacitor as claimed in claim 2, characterized in that the solvent of the electrolyte consists of a mixture of N,N-dimethylacetamide and N-monomethylacetamide with 15–50% by weight of N-monomethylacetamide.

9. A capacitor as claimed in claim 2, characterized in that a known oxidizing agent is dissolved or dispersed in the electrolyte solution.

* * * * *